United States Patent
High

(10) Patent No.: US 7,997,629 B2
(45) Date of Patent: Aug. 16, 2011

(54) KNOT TYING APPARATUS

(75) Inventor: Kenneth A. High, Helena, MT (US)

(73) Assignee: Dr. Slick Company, Belgrade, MT (US)

( * ) Notice: Subject to any disclaimer, the term of this patent is extended or adjusted under 35 U.S.C. 154(b) by 21 days.

(21) Appl. No.: 12/557,044

(22) Filed: Sep. 10, 2009

(65) Prior Publication Data

US 2010/0066083 A1     Mar. 18, 2010

Related U.S. Application Data

(60) Provisional application No. 61/096,489, filed on Sep. 12, 2008.

(51) Int. Cl.
*D03J 3/00* (2006.01)
(52) U.S. Cl. .......................................................... 289/17
(58) Field of Classification Search .................... 289/17; 606/148

See application file for complete search history.

(56) References Cited

U.S. PATENT DOCUMENTS

| | | | |
|---|---|---|---|
| 3,106,417 A | 10/1963 | Clow | |
| 3,131,957 A | 5/1964 | Musto | |
| 3,521,918 A | 7/1970 | Hammond | |
| 3,837,691 A | 9/1974 | Smythe | |
| 4,572,554 A | 2/1986 | Janssen et al. | |
| 4,864,762 A | 9/1989 | Cox | |
| 5,098,137 A | 3/1992 | Wardall | |
| 5,236,232 A | 8/1993 | Broberg | |
| 5,324,298 A * | 6/1994 | Phillips et al. | ............ 606/148 |
| 5,520,703 A | 5/1996 | Essig et al. | |
| 5,536,051 A | 7/1996 | Morin | |
| 5,593,189 A | 1/1997 | Little | |
| 5,647,616 A | 7/1997 | Hamilton | |
| 5,716,368 A * | 2/1998 | de la Torre et al. | ............ 606/148 |
| 5,791,699 A | 8/1998 | High | |
| 5,829,798 A | 11/1998 | Little | |
| 5,951,067 A | 9/1999 | High | |
| 5,971,447 A | 10/1999 | Steck, III | |
| 6,105,299 A | 8/2000 | Rich | |
| 6,454,777 B1 | 9/2002 | Green | |
| 6,770,076 B2 | 8/2004 | Foerster et al. | |
| 7,041,119 B2 | 5/2006 | Green et al. | |
| 7,083,638 B2 | 8/2006 | Foerster et al. | |
| 7,204,841 B2 | 4/2007 | Green et al. | |
| 7,556,640 B2 | 7/2009 | Foerster et al. | |
| 7,695,494 B2 | 4/2010 | Foerster et al. | |
| 2002/0111653 A1 | 8/2002 | Foerster et al. | |
| 2002/0120290 A1 | 8/2002 | Green et al. | |
| 2002/0128194 A1 | 9/2002 | Green et al. | |
| 2003/0018345 A1 | 1/2003 | Green et al. | |

(Continued)

OTHER PUBLICATIONS

PCT/US2009/056609, Apr. 21, 2010, Search Report.
PCT/US2009/056609, Apr. 21, 2010, Written Opinion.

*Primary Examiner* — Shaun R Hurley

(74) *Attorney, Agent, or Firm* — Wells St. John, P.S.

(57) ABSTRACT

A knot tying apparatus for tying a pair of fishing lines to one another is provided. The apparatus includes a tubular body having a through passage extending between opposite first and second ends with a slot extending from the first end toward the second end. Further, the apparatus has an actuator coupled to the tubular body for sliding movement between the first and second ends. The actuator is moveable between the first and second ends via application of an external force to removed loops of the one of the lines from the tubular body onto the other of the lines.

20 Claims, 5 Drawing Sheets

U.S. PATENT DOCUMENTS

2003/0233109 A1 12/2003 Green et al.
2004/0243179 A1 12/2004 Foerster et al.
2004/0260345 A1 12/2004 Foerster et al.
2005/0277986 A1 12/2005 Foerster et al.

* cited by examiner

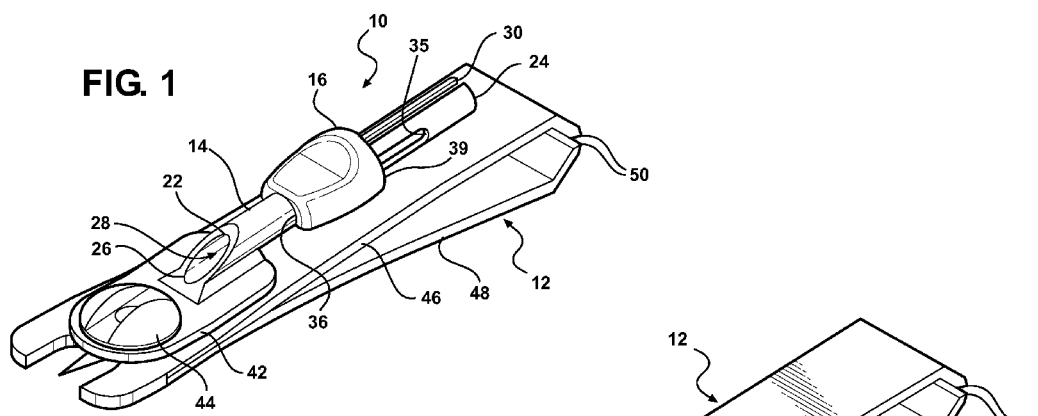
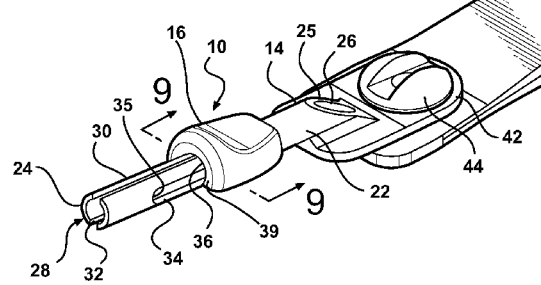
FIG. 1
FIG. 2

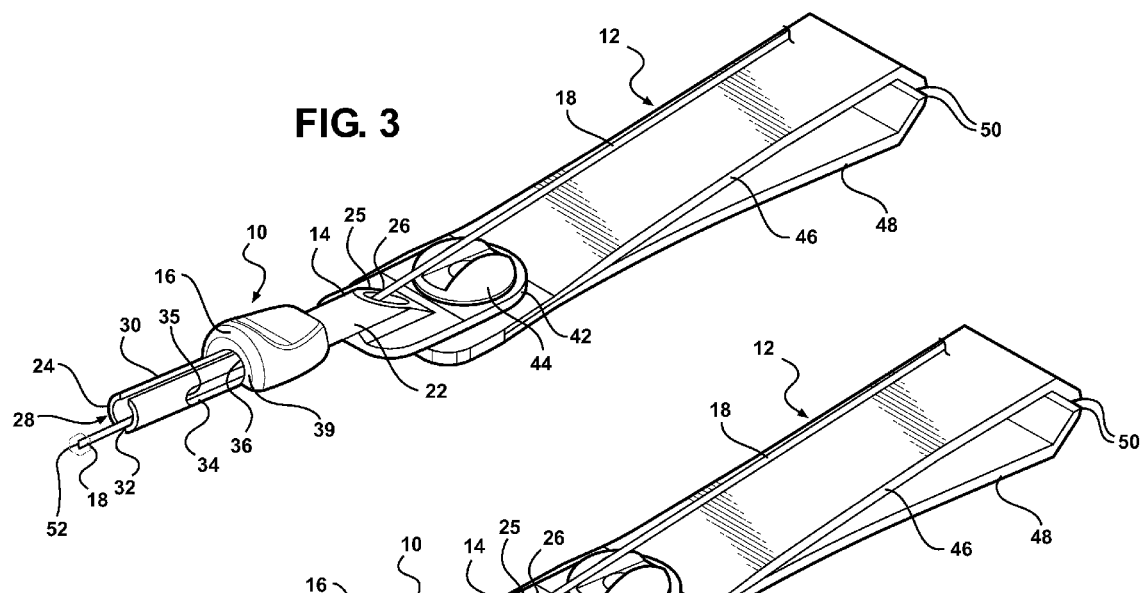

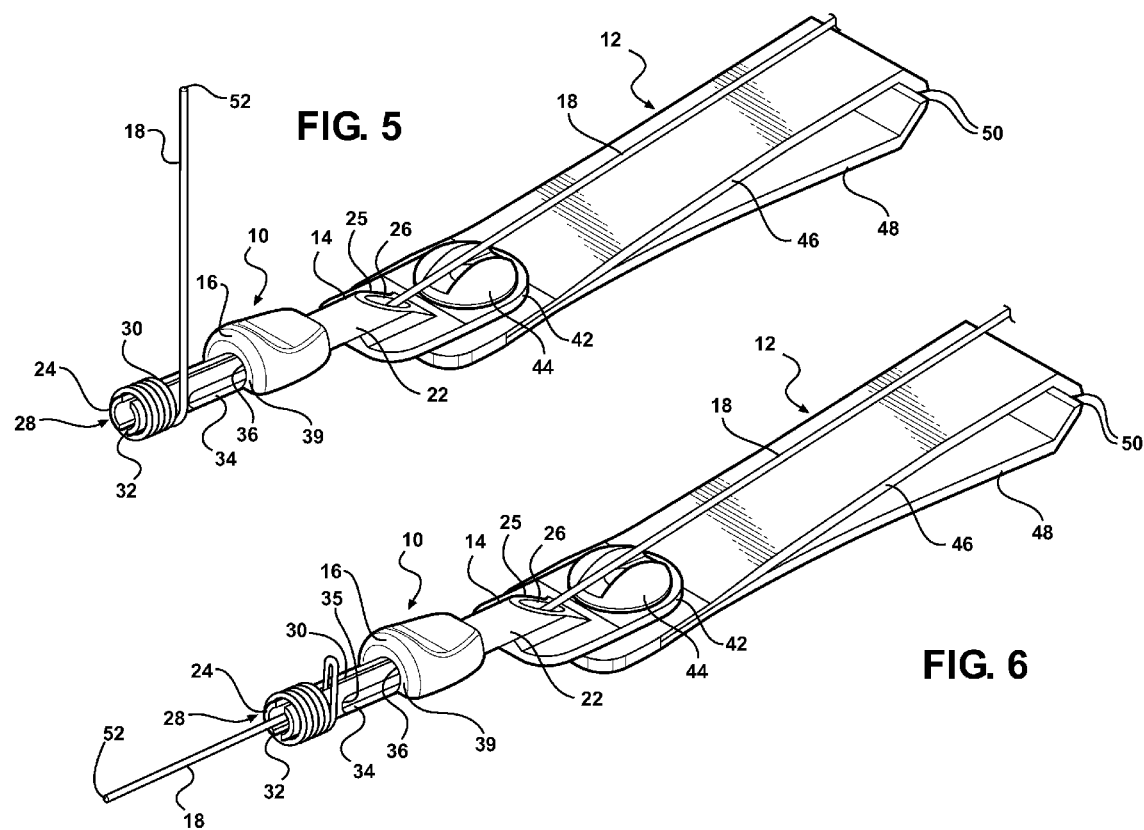

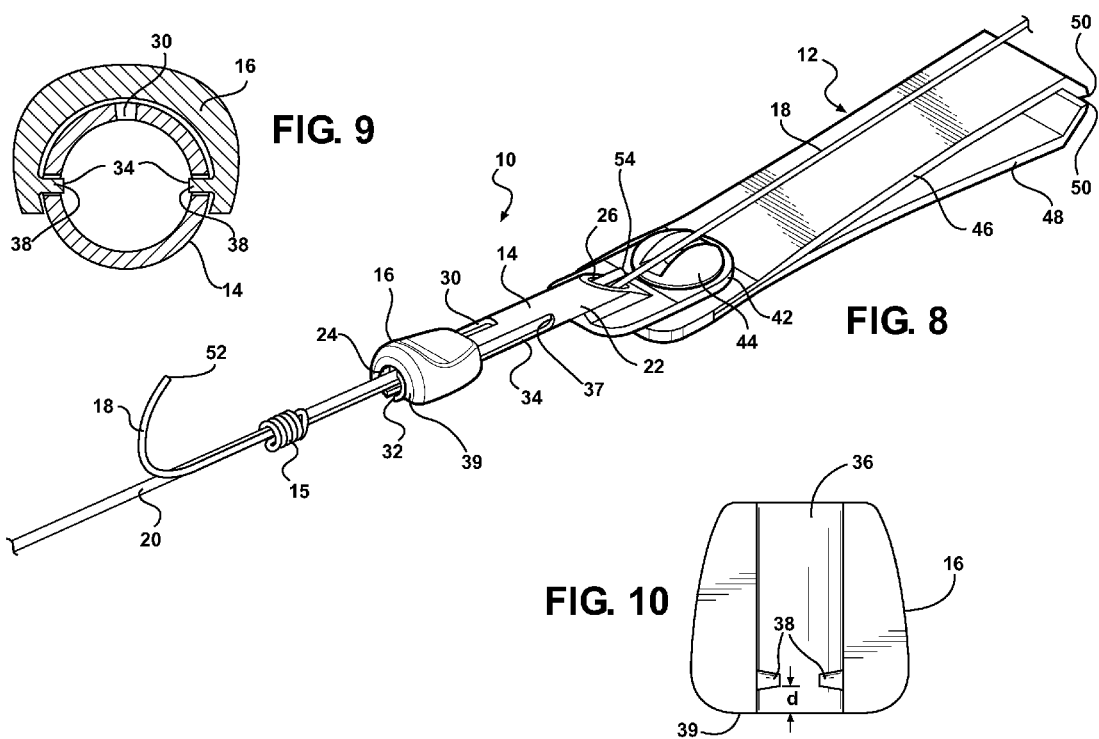

KNOT TYING APPARATUS

CROSS-REFERENCE TO RELATED APPLICATION

This application claims the benefit of U.S. Provisional Application Ser. No. 61/096,489, filed Sep. 12, 2008, which is incorporated herein by reference in its entirety.

BACKGROUND OF THE INVENTION

1. Technical Field

This invention relates generally to knot tying apparatus, and more particularly to knot tying apparatus for tying knots in fishing line.

2. Related Art

Tying knots in fishing line can prove difficult, particularly if a knot known as a "nail knot" is desired. Tying a nail knot requires manipulating one fishing line by forming multiple loops of the fishing line about itself and passing a free end of the looped fishing line through the formed loops, then passing a free end of another fishing line through the formed loops and synching the loops to a tightly closed configuration about the free end of the other line. This process of forming a nail knot is widely regarded as one of the most difficult knots to tie. As such, various methods and apparatus have been used in an effort to simplify the process.

It is known to form loops of one line about a post or arbor, and then transfer the line from the arbor onto another line. Unfortunately, during the transfer step, the loops can become distorted or they can fall apart, thereby resulting in an undesirable knot or no knot at all. Other apparatus are also known, and can be helpful in tying a nail knot. Unfortunately, these apparatus can be bulky and/or costly in manufacture. For example, one known nail knot tyer includes a spring biased actuator incorporating a first spring member and a spring biased arbor or piston incorporating a second spring member. Upon depressing the actuator, thereby compressing the first spring, the second spring biases the piston from an extended position to a retracted position. To use the apparatus again, the second spring is compress by pushing on the piston until the actuator is moved to a locked position under the bias of the first spring. Although this apparatus is useful for typing nail knots, it can prove costly to manufacture, both from a process standpoint and a component standpoint.

Accordingly, it would be desirable to provide a nail knot tying apparatus that is useful for tying nail knots in a reliable fashion, while also being compact and economical in manufacture.

SUMMARY OF THE INVENTION

A knot tying apparatus has a tubular body with a through passage extending between opposite first and second ends with a slot extending from the first end toward the second end. An actuator is coupled to the tubular body for sliding movement between the first and second ends. The actuator is moveable between the first and second ends via application of an external force.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 1 is a perspective view of a knot tying apparatus constructed in accordance with one aspect of the invention attached to a clipper apparatus shown in collapsed, stowing position;

FIG. 2 is a view of the apparatus of FIG. 1 shown in a deployed position for use;

FIGS. 3-7 illustrate a process for tying a nail knot in a first fishing line with the knot tying apparatus;

FIG. 8 illustrates the nail knot being synched about a second fishing line to join the first and second fishing lines together;

FIG. 9 is a schematic cross-sectional view taken generally along line 9-9 of FIG. 2; and FIG. 10 is a bottom view of an actuator constructed in accordance with one aspect of the knot tying apparatus.

DETAILED DESCRIPTION OF PRESENTLY PREFERRED EMBODIMENTS

Figure 7:
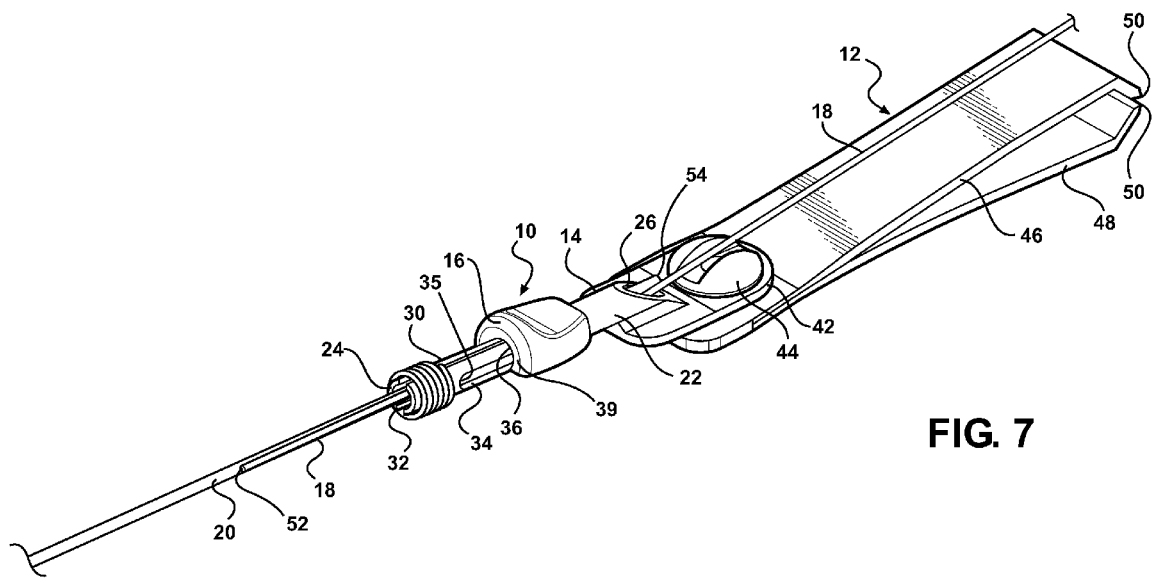

Referring in more detail to the drawings, FIG. 1 illustrates a knot tying apparatus generally at 10 constructed in accordance with one aspect of the invention attached to a clipping apparatus 12. The knot tying apparatus 10 is economical in manufacture and in use, in that it has a minimal number of parts moveable relative to one another, represented here as having a tubular body 14 and a sliding button, referred to hereafter as an actuator 16, wherein the actuator is slidable relative to the tubular body 14. The knot tying apparatus 10 is used to tie a nail-type knot 15 (FIG. 8), which are commonly used to join separate fishing lines to one another, particularly in fly fishing, wherein a first fishing line, such as a tippet or leader 18 is joined to a fly line 20.

The tubular body 14 is represented here, by way of example and without limitation, as having a generally cylindrical wall 22 extending between opposite front and rear ends, also referred to as first and second ends 24, 26, respectively. The second end 26 can be formed having an tapered or inclined surface 25, if desired. A through passage 28 extends between the opposite first and second ends 24, 26. A slot 30 extends from the first end 24 toward the second end 26, and is represented here, fore example, as terminating prior the second end 26. The slot 30 extends generally about ¾-1" or more, and could extend over the entire length of the body 14. The slot 30 is constructed having a relatively narrow circumferential width, wherein the width is sufficient to pass the first fishing line 18 therein.

The tubular body 14 also has a catch configured to facilitate initial wrapping of the first fishing line 18 about the tubular body 14, wherein the catch is shown here, by way of example and without limitation, as being a notch 32 extending into the first end 24. The notch 32 extends axially sufficiently into the first end 24 to receive the first fishing line 18 therein, such as about 1-5 mm, for example. The notch 32 is spaced circumferentially from the slot 30, represented here, for example, as being diametrically opposite the slot 30. The slot 30 is illustrated as extending axially along an upper surface of the tubular body 14 (i.e. 12 o'clock position), wherein the notch 32 is illustrated as extending axially along a lower surface of the tubular body 14 (i.e., 6 o'clock position). The notch 32 has a width slightly larger than the diameter of the first fishing line 18 to allow it to be received therein without damaging the first fishing line. It is contemplated that the catch 32, rather than being formed as a notch extending into the tubular body, could be formed as a nub or protrusion extending outwardly from the end of the tubular body 14, thereby allowing the first fishing line 18 to be "captured" against slipping along the end of the tubular body 14 during the initial wrapping of the first fishing line 18 about the tubular body 14.

The tubular body 14 also has a groove, and represented here, by way of example and without limitation, as a pair of slots or grooves 34 extending between the opposite ends 24, 26 axially along the body 14. The grooves 34 can extend into the wall 22 or through the wall 22 as through slots, as desired. The grooves 34 are represented as being formed on diametrically opposite sides of the body 14 (i.e., 3 and 9 o'clock positions), for example. The grooves 34 are also shown as extending less than the full length of the tubular body 14 and terminating at opposite front and rear ends 35, 37, respectively, before reaching the first and second ends 24, 26 of the tubular body 14. Accordingly, the grooves 34 are completely bounded by the wall 22 of the tubular body 14.

The actuator 16 is coupled to the tubular body 14 for sliding movement between the first and second ends 24, 26. The actuator 16 is generally free from biased movement along the body 14, and can be readily moved by application of an external force, such as via a users thumb or finger. The actuator 16 is represented here as being generally semi-cylindrical, although it could be cylindrical if desired, wherein a concave surface 36 is configured for sliding movement along an external convex surface of the tubular body 14. Accordingly, the concave surface has a substantially similar radius of curvature as the convex cylindrical outer surface of the tubular body 14. To facilitate maintaining the actuator 16 assembled on the tubular body 14, the actuator has a protrusion, and represented here as a pair of protrusions 38 (FIG. 9) extending radially inwardly from the concave surface 36 and being configured for sliding receipt in the grooves 34. As such, the protrusions 38 track within the grooves 34 and are maintained in the grooves 34 while sliding the actuator 16 between a fully retracted position, such as shown in FIGS. 2-7, wherein the protrusions 38 abut the rear ends 37 of the grooves 34, and a fully extended position, as shown in FIG. 8, wherein the protrusions 38 abut the front ends 35 of the grooves 34. Further, the protrusions 38 are preferably set back from a front, line-engaging end 39 of the actuator 16 a distance (d, as shown in FIG. 10) the same as or substantially the same as the distance spanning between the front end 24 of the tubular body 14 and the front ends 35 of the grooves 34. Accordingly, when the protrusions 38 are brought into abutment with the front ends 35 of the grooves 34 the front end 39 of the actuator 16 is flush or substantially flush with the front end 24 of the tubular body 14. In addition, the actuator 16 can be formed having a recessed or otherwise contoured upper surface 40 to facilitate sliding the actuator with a thumb or finger.

To facilitate attaching the knot typing apparatus to the clipping apparatus 12, a mounting pad 42 is fixed to the second end 26 of the tubular body 14. The mounting pad 42 can be adhered, welded or otherwise fixed to the tubular body 14. By way of example and without limitation, the mounting pad 42 has a through opening for receipt of a fastener, such as a screw or rivet 44. The rivet 44 couples the mounting pad 42 to an end of the clipping apparatus 12 such that the knot typing apparatus 10 and the clipping apparatus 12 can be pivoted relative to one another between a stowage position (FIG. 1) and a use position (FIGS. 2-8).

The clipping apparatus 12 is configured similar to nail clippers, having a pair of clipping fingers 46, 48 movable between a relaxed, non-cutting position and a compressed, cutting position. Each finger 46, 48 has a cutting edge 50 at an end opposite the mounting pad 42. With the knot typing apparatus 10 pivoted to the use position, a user can readily apply a force to each finger 46, 48 to compress the fingers toward one another, and thus the cutting edges 50 into cutting engagement with one another.

In a process for tying a nail knot with the apparatus 10, the knot tying apparatus 10 is rotated from the stowing position (FIG. 1) to the use position (FIG. 2) by pivoting the body 14 about the fastener 44. A free end 52 of the first fishing line 18 is fed through the second end 26 of the tubular body 14 and through the through passage 28 so that the free end extends outwardly from the first end 24 of the tubular body 14 (FIG. 3). The free end 52 is then routed so that the first fishing line 18 is received in the notch 32 (FIG. 4). With the actuator 16 moved toward the second end 26 of the tubular body 14 into a retracted position, the first fishing line 18 is then looped circumferentially around the outer surface of the cylindrical wall 22, wherein about 5 to 9 loops are preferably formed (FIG. 5). Upon forming the desired number of loops, the free end 52 of the first fishing line 18 is then disposed through the slot 30, through the through passage 28 and out the first end 24 of the tubular body 14 (FIG. 6). Now, a free end 54 of the second fishing line 20 is fed into the first end 24 of the tubular body 14 adjacent the first fishing line 18 and through the through passage 28 such that the free end 54 of the second fishing line 20 is exposed outwardly from the second end 26 (FIG. 7). Now, the user can place of finger or thumb on the free end 54 of the second fishing line 20 to maintain it in a fixed position, and then slide the actuator 16 from its retracted position toward the first end 24 of the tubular body 14 into an extended position, thereby moving the loops of the first fishing line 18 off of the tubular body 14 (FIG. 8). With the protrusions 38 being brought into abutment with the front ends 35 of the grooves 34, the loops are assured of being removed from the tubular body 14. This is due to the fact that the front end 39 of the actuator 16 is brought flush or substantially flush with the front end 24 of the tubular body 14. To finish the forming the knot 15, the respective free ends 52, 54 of the first and second fishing lines 18, 20 are then pulled, wherein the loops are synched and tightly closed about the first and second fishing lines 18, 20, thereby fixing the lines 18, 20 together. The knot tying apparatus 10 can then removed by sliding it from the first fishing line 18.

Obviously, many modifications and variations of the present invention are possible in light of the above teachings. For example, the knot tying apparatus 10 can be constructed as single apparatus, or it could be attached to any secondary apparatus to provide a multifunction instrument. It is, therefore, to be understood that within the scope of the appended claims, the invention may be practiced otherwise than as specifically described.

What is claimed is:

1. A knot tying apparatus, comprising:
a hollow body having a through passage extending between opposite first and second ends, a first portion which includes a slot extending from said first end toward said second end, and a second portion which completely bounds an adjacent portion of the through passage; and
an actuator coupled to said hollow body for sliding movement between said first and second ends, said actuator being moveable between said first and second ends via application of an external force.

2. The knot tying apparatus of claim 1 wherein said hollow body has a catch extending from said first end and being spaced circumferentially from said slot.

3. The knot tying apparatus of claim 2 wherein said catch is a notch extending into said first end.

4. The knot tying apparatus of claim 1 wherein said hollow body has a groove extending between said first and second ends and said actuator has a protrusion configured for sliding receipt in said groove.

5. The knot tying apparatus of claim 4 wherein said hollow body has a pair of said grooves substantially diametrically opposite one another and said actuator has a pair of said protrusions configured for sliding receipt in said grooves.

6. The knot typing apparatus of claim 5 wherein said grooves are completely bounded by said hollow body wherein said protrusions are captured in said grooves with said hollow body confronting said protrusions and preventing removal of said actuator from said hollow body.

7. A knot tying apparatus consisting of:
  a hollow body having a through passage extending between opposite first and second ends with a slot extending from said first end toward said second end and a catch extending from said first end; and
  an actuator coupled to said hollow body for sliding movement between said first and second ends, said actuator being free from biased movement and being moveable between said first and second ends via application of an external force.

8. The knot tying apparatus of claim 7 wherein said catch is a notch extending into said first end.

9. The knot tying apparatus of claim 7 wherein said hollow body has a pair of grooves extending between said first and second ends and said actuator has a pair of protrusions configured for sliding receipt in said grooves.

10. The knot typing apparatus of claim 9 wherein said protrusions are captured in said grooves with said hollow body confronting said protrusions and preventing removal of said actuator from said hollow body.

11. The knot tying apparatus of claim 1 wherein the hollow body is a tubular body.

12. A knot tying method comprising:
  first passing a free end of a first line through at least a first portion of a hollow body;
  after the first passing, wrapping the free end of the first line about the hollow body forming a plurality of loops of the first line about the hollow body;
  after the wrapping, second passing the free end of the first line through at least a second portion of the hollow body and the plurality of loops;
  third passing a free end of a second line through the hollow body and the loops of the first line;
  after the third passing, separating the loops of the first line from the hollow body;
  after the separating, synching the loops about the first and second lines to form a knot which fixes the first and second lines together; and
  wherein the separating comprises sliding an actuator which is coupled with the hollow body along an exterior surface of the hollow body to slide the loops off the hollow body.

13. The method of claim 12 further comprising passing the free end of the first line through a catch after the first passing and before the wrapping.

14. The method of claim 12 wherein the first passing comprises feeding the free end of the first line into a first end of the hollow body and the second passing comprises feeding the free end of the second line into a second end of the hollow body.

15. The method of claim 12 wherein the second passing comprises passing the free end of the first line through a slot formed in the hollow body.

16. The method of claim 12 further comprising, after the synching, sliding the hollow body over the first line.

17. The method of claim 12 wherein the second passing comprises passing the free end of the first line out of the hollow body and the third passing comprises passing the free end of the second line out of the hollow body.

18. The method of claim 17 further comprising maintaining the free end of the second line out of the hollow body during the separating.

19. The method of claim 17 wherein the synching comprises pulling the free ends of the first and second lines.

20. The knot tying apparatus of claim 7 wherein the hollow body is a tubular body.

* * * * *

UNITED STATES PATENT AND TRADEMARK OFFICE
CERTIFICATE OF CORRECTION

PATENT NO. : 7,997,629 B2
APPLICATION NO. : 12/557044
DATED : August 16, 2011
INVENTOR(S) : Kenneth A. High It is certified that error appears in the above-identified patent and that said Letters Patent is hereby corrected as shown below:

Title Page, Item (56) References Cited – Replace "2002/0128194 A1 9/2002 Green et al." with --2002/0128684  9/2002  Foerster--

In the Specifications:

Column 1, line 43 – Replace "for typing nail" with --for tying nail--

Column 2, line 42 – Replace "fore example" with --for example--

Column 3, line 51 – Replace "typing apparatus" with --tying apparatus--

Column 3, line 59 – Replace "typing apparatus" with --tying apparatus--

Column 3, line 66 – Replace "typing apparatus" with --tying apparatus--

Column 4, line 36 – Replace "the forming the" with --forming the--

Column 4, line 40 – Replace "then removed" with --then be removed--

In the Claims:

Column 5, line 9 – Replace "typing apparatus" with --tying apparatus--

Column 5, line 30 – Replace "typing apparatus" with --tying apparatus--

Signed and Sealed this
Seventh Day of May, 2013

Teresa Stanek Rea
*Acting Director of the United States Patent and Trademark Office*